United States Patent [19]
Ishiwatari et al.

[11] Patent Number: 4,658,388
[45] Date of Patent: Apr. 14, 1987

[54] OPTICAL RECORDING MEDIUM WHICH INCLUDES A CORROSION RESISTANT FILM OF A MIXTURE OF A CARBIDE AND A NITRIDE

[75] Inventors: Takahiko Ishiwatari, Nihonbashi; Hiroyoshi Kishi, Tokyo; Hisaaki Kawade, Yokohama; Masaaki Matsushima, Yokohama; Mitsuharu Sawamura, Yokohama; Kazuoki Honguu, Yokohama, all of Japan

[73] Assignee: Canon Kabushiki Kaisha, Tokyo, Japan

[21] Appl. No.: 779,414

[22] Filed: Sep. 24, 1985

[30] Foreign Application Priority Data

Sep. 28, 1984 [JP] Japan ................ 59-203034

[51] Int. Cl.[4] ............ G11B 7/00; G11B 7/24; G11B 11/00
[52] U.S. Cl. ............ 369/13; 369/284; 369/288; 369/275; 430/945; 430/961; 360/131
[58] Field of Search ............ 369/275, 284, 286, 288, 369/13; 430/945, 961; 428/64, 65, 913, 698, 704, 900, 627; 360/131

[56] References Cited

U.S. PATENT DOCUMENTS

| | | | |
|---|---|---|---|
| 3,665,483 | 5/1972 | Becker et al. | 369/275 |
| 3,787,223 | 1/1974 | Reedy, Jr. | 428/627 |
| 4,277,540 | 7/1981 | Aine | 428/433 |
| 4,450,201 | 5/1984 | Brill et al. | 428/698 |
| 4,509,161 | 4/1985 | Van de Leest et al. | 369/275 |
| 4,517,217 | 5/1985 | Hoffman | 428/627 |

FOREIGN PATENT DOCUMENTS

| | | | |
|---|---|---|---|
| 0074843 | 6/1981 | Japan | 369/13 |
| 0196635 | 11/1983 | Japan | 369/284 |

OTHER PUBLICATIONS

Inamura, "New Magnets-Optical Memory", May 1981, J. INSE. Electron & Commun. Eng., vol. 64, No. 5, pp. 494–500.
IBM Tech. Dis. Bulletin, vol. 25, No. 5, Oct. 1982, pp. 2604–2605, "Low-Temperature Optical Storage Films by Ahn et al.

Primary Examiner—Raymond F. Cardillo
Assistant Examiner—Hoa T. Nguyen
Attorney, Agent, or Firm—Fitzpatrick, Cella, Harper & Scinto

[57] ABSTRACT

An optical recording medium having a substrate, an optical recording layer formed on the substrate, and at least one film consisting of a carbide and a nitride and formed on the substrate.

11 Claims, 5 Drawing Figures

OPTICAL RECORDING MEDIUM WHICH INCLUDES A CORROSION RESISTANT FILM OF A MIXTURE OF A CARBIDE AND A NITRIDE

BACKGROUND OF THE INVENTION

1. Field of the Invention

This invention relates to an optical recording medium which is capable of accomplishing recording and reproduction by a light beam.

2. Description of the Prior Art

Thin films of alloys of rare earth-transition metals, thin films of reductive oxides such as chalcogen compounds utilizing the phase shift from non-crystalloid to crystalloid, heat mode recording mediums, thermoplastic recording mediums, etc. are known as optical recording medium used in optical discs. For example, as magneto-optical recording mediums formed by thin films of alloys of rare earth-transition metals, there are known polycrystal thin films such as MnBi and MnCuBi, non-crystalloid or amorphous thin films such as GdCo, GdFe, TbFe, DyFe, GdTbFe, TbDyFe, GdFeCo, TbFeCo and GdTbCo, and single crystal thin films such as GIG (gadolinium iron garnet).

Of these thin films, the non-crystalloid thin films have recently been considered to be excellent as magneto-optical recording mediums with the film formability with which a thin film of a large area is made at a temperature in the vicinity of room temperature, the writing efficiency for writing a signal with small light-heat energy and the reading efficiency for reading out the written signal at a good S/N ratio being taken into account. Particularly, GdTbFe having a curie temperature of the order of 150°-200° C. and GdTbFeCo having a great Kerr rotation angle and excellent in reproducing performance (Japanese Laid-open Patent Application No. 196639/1983 corresponding to U.S. application Ser. No. 820,828) are suitable for a magneto-optical recording medium.

However, non-crystalloid magnetic materials, including GdTbFe, are generally inferior in corrosion resistance and suffer from a disadvantage that they are corroded in an atmosphere having moisture and become deteriorated in magnetic characteristic. Particularly, in a construction in which a reflecting layer or an interference layer and a reflecting layer are provided on the back side of the magnetic recording layer (that side opposite to the side on which light is incident) for the purpose of improving the S/N ratio, the thickness of the magnetic recording layer must be made small from the necessity of effectively utilizing the Faraday effect and therefore, the corrosion resistance is more aggravated. Such deterioration of the recording characteristic resulting from oxidation has been a disadvantage common to magneto-optical recording mediums and optical recording mediums.

In order to eliminate such a disadvantage, there have been proposed disc-like optical recording mediums of a structure in which various protective layers are provided on an optical recording layer, or of the air sandwich structure in which a magnetic recording layer is enveloped by inert gas, or of the cemented structure in which another substrate is cemented to a protective layer with an adhesive layer interposed therebetween. In any of these, however, the protecting effect has been insufficient in a case where the recording layer is formed of a readily oxidizable material or where the thickness of the recording layer is very small.

SUMMARY OF THE INVENTION

It is an object of the present invention to provide an optical recording medium which is more excellent in corrosion resistance than the recording mediums according to the prior art.

Such object of the present invention is achieved by an optical recording medium characterized by at least an optical recording layer and a film consisting of a carbide and a nitride provided on a substrate.

The carbide may preferably be silicon carbide.

The carbide and the nitride may be used variously if they are transparent and excellent in corrosion resistance when they are formed into a film. They may be, for example, silicon carbide (SiC) and silicon nitride ($Si_3N_4$), or SiC and aluminum nitride (AlN).

DESCRIPTION OF THE PREFERRED EMBODIMENTS

Figure 1:
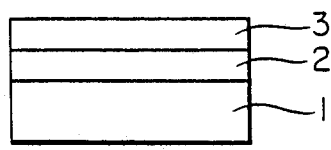
FIGS. 1 to 4 are schematic cross-sectional views of the optical recording mediums of the present invention.

A first embodiment of the optical recording medium of the present invention is shown in FIG. 1.

Reference numeral 1 designates a substrate, reference numeral 2 denotes a recording layer, and reference numeral 3 designates a film consisting of a carbide and a nitride.

The substrate 1 may be formed of glass, a plastic such as polymethyl methacrylate resin (PMMA) or polycarbonate resin (PC), or a metal such as aluminum, and may be pre-formed with a tracking pregroove. On the substrate 1, a recording layer of GdTbFe or the like is formed by a method such as sputtering, whereafter a film consisting of a carbide and a nitride is formed by a method such as sputtering.

More specifically, the film consisting of a carbide and a nitride is formed as by arranging Si on a thin SiC film and forming a film consisting of SiC and $Si_3N_4$ with Ar and $N_2$ as sputter gases, or sputtering SiC as a first target and $Si_3N_4$ as a second target at a time.

The film 3 may be formed to a film thickness of 50–10000 Å preferably, 200–3000 Å, by the abovedescribed method.

Figure 2:
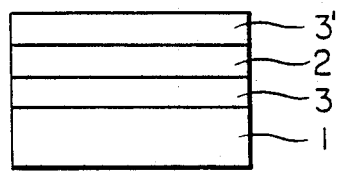

In FIG. 1, there is shown an example in which the film 3 consisting of a carbide and a nitride is provided only on that side of the recording layer 2 which is opposite to the substrate 1, but the protective film may be provided on that side of the recording layer 2 which is adjacent to the substrate 1 or may be provided on the opposite sides of the recording layer 2 as indicated by film 3 and 3' in FIG. 2. Other auxiliary layers, for example, an interference layer of a material such as SiO, $MgF_2$, $Nb_2O_5$, $Ta_2O_5$, $Al_2O_3$, AlN or $Si_3N_4$ and a reflecting layer of a metal such as Cu, Al or Au, may also be provided as required. The recording layer and the film consisting of a carbide and a nitride may be provided either in contact with each other or with other auxiliary layers interposed therebetween.

After the optical recording layer, the film consisting of a carbide and a nitride and the auxiliary layers have been provided on the substrate as required, a protective substrate may be provided on that side opposite to the substrate, or a so-called cemented structure or an air sandwich structure having inert gas enveloped therein may be adopted.

Figure 3:
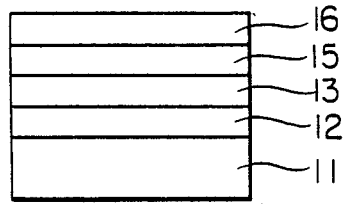
Figure 4:
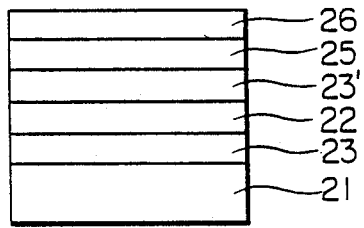

Other embodiments of the optical recording medium of the present invention are shown in FIGS. 3 and 4.

FIG. 3 shows an embodiment in which are recording layer 12, a film 13 consisting of a carbide and a nitride, a reflecting layer 15 and a protective layer 16 are provided successively on a substrate 11. The film 13 performs the function as a protective film and also the function as an optical interference film which causes multiplex interference between the recording layer 12 and the reflecting layer 15 and increases the Kerr rotation angle. FIG. 4 shows an embodiment in which a film 23 consisting of a carbide and a nitride, a recording layer 22, a film 23' consisting of a carbide and a nitride, a reflecting layer 25 and a protective layer 26 are provided successively on a substrate 21. The film 23' performs the function as an optical interference film.

Some examples of the method of making the optical recording medium of the present invention will be shown below to describe the above embodiments more specifically.

EXAMPLE 1

The magneto-optical recording medium of the structure shown in FIG. 1 was manufactured in the following manner.

A white glass plate of 1 inch × 3 inches and having a thickness of 1 mm was used as the substrate 1 and, in a high frequency sputtering apparatus, the recording layer 2 of GdTbFe was formed to a thickness of 1000 Å by sputtering in Ar gas with pieces of Gd and Tb each of 10 mm × 10 mm uniformly arranged on Fe of 5 inches $\phi$ being used as a first target. On this recording layer, an SiC-Si$_3$N$_4$ (50:50 atom %) film was layered to a thickness of 1000 Å by sputtering in a mixture of Ar and N$_2$ gases at a ratio of 1:1 with pieces of Si of 10 mm × 10 mm uniformly arranged on SiC of 5 inches $\phi$ being used as a second target. The transmittance of the SiC-Si$_3$N$_4$ film was 92% for a wavelength 830 nm. A corrosion resistance test was carried out with the thus made magneto-optical recording medium placed into a thermo-hygrostat of temperature 85° C. and relative humidity 85%.

For comparison, corrosion resistance tests were carried out at a time with respect to a magneto-optical recording medium manufactured in the same manner as Example 1 with the exception that the SiC-Si$_3$N$_4$ film was not formed and a magneto-optical recording medium (Comparative Example 1) manufactured in the same manner as Example 1 with the exception that instead of the SiC-Si$_3$N$_4$ film, an SiO film was formed to a thickness of 1000 Å by evaporation.

Figure 5:
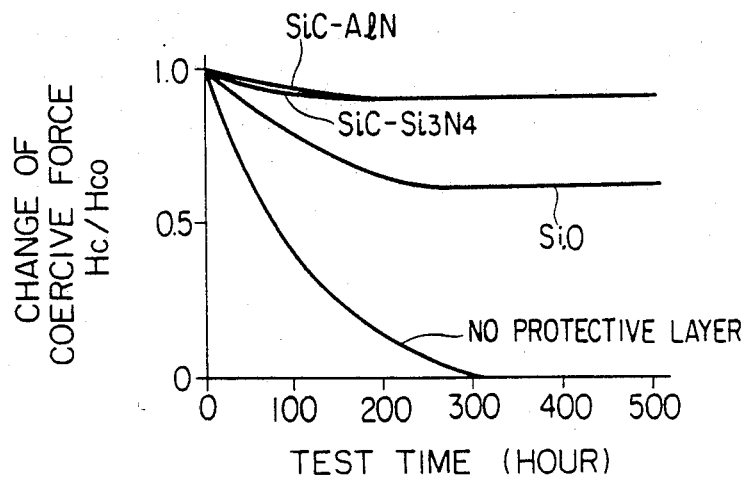
FIG. 5 shows the result of the corrosion resistance test of an optical recording medium in which no protective layer is provided, an optical recording medium in which an SiO film is provided as a protective layer, and the optical recording medium of the present invention.

The result is shown in FIG. 5. In FIG. 5, the ordinate represent the change of coercive force and the abscissa represents the test time. The change (Hc) of coercive force is expressed at a ratio to the initial value (Hc$_0$). It is seen that as the reduction in coercive force was greater, the oxidation or corrosion of GdTbFe which was the recording layer progressed more. As is apparent from FIG. 5, magneto-optical recording medium of Example 1 in which the SiC-Si$_3$N$_4$ film was formed exhibits the most excellent corrosion resistance.

With regard to the Kerr rotation angle which governs the reproducibility, there was little change as compared with the initial value where SiC-Si$_3$N$_4$ was used as the protective layer.

EXAMPLE 2

By using only an SiC target in an atomosphere of Ar gas or by changing the number of pieces of Si arranged on SiC in a mixture of Ar and N$_2$ gases at a ratio of 1:1, magneto-optical recording mediums in which the composition ratios of SiC and Si$_3$N$_4$ were 0:100, 10:90, 20:80, 50:50, 80:20, 90:10 and 100:0 (all being atom %) were manufactured in the same manner as Example 1.

The transmittance of the SiC-Si$_3$N$_4$ film at a wavelength 830 nm and the ratio of the coercive force to the initial value (Hc/Hc$_0$) when corrosion resistance tests were carried out for 500 hours with the recording mediums being placed into a thermo-hygrostat of temperature 85° C. and relative humidity 85% were measured. The result is shown in Table 1 below.

TABLE 1

| Sample No. | SiC (atom %) | Si$_3$N$_4$ (atom %) | Transmittance (%) | Hc/Hc$_0$ |
|---|---|---|---|---|
| 1 | 0 | 100 | 93 | 0.6 |
| 2 | 10 | 90 | 93 | 0.8 |
| 3 | 20 | 80 | 92 | 0.9 |
| 4 | 50 | 50 | 92 | 0.9 |
| 5 | 80 | 20 | 91 | 0.9 |
| 6 | 90 | 10 | 84 | 0.9 |
| 7 | 100 | 0 | 75 | 0.9 |

In a case where SiC:Si$_3$N$_4$ is 0:100 atom %, the recording medium has a transmittance of 93% and thus is excellent in transparency, but is not sufficient in corrosion resistance, and in a case where SiC:Si$_3$N$_4$ is 100:0 atom %, the recording medium is excellent in corrosion resistance but is inferior in transparency. In contrast, in cases where SiC:Si$_3$N$_4$ is 10:90–90:10 atom %, the recording medium is excellent both in transparency and corrosion resistance. In case where SiC:Si$_3$N$_4$ were 20:80–80:20 atom %, a particularly good result, that is, a transmittance of 91–92% and Hc/Hc$_0$ of 0.9, was obtained.

EXAMPLES 3 and 4

The magneto-optical recording medium of the structure shown in FIG. 2 was manufactured in the following manner.

PMMA (Example 3) and PC (Example 4) each of 1 inch × 3 inches and having a thickness of 1.2 mm were used as the substrate 1, pieces of Si of 10 mm × 10 mm were uniformly arranged on SiC of 5 inches $\phi$, and in a mixture of Ar and N$_2$ gases at a ratio of 1:1, an SiC-Si$_3$N$_4$ film 3 in which SiC:Si$_3$N$_4$ was 50:50 was formed to a thickness of 200 Å by sputtering. Subsequently, with pieces of Gd and Tb each of 10 mm × 10 mm uniformly arranged on Fe of 5 inches $\phi$ being used as a target, GdTbFe as the recording layer 2 was formed to a thickness of 1000 Å by sputtering in Ar gas. Subsequently, on this recording layer, an SiC-Si$_3$N$_4$ film 3' was formed to a thickness of 1000 Å in the above-described manner.

A corrosion resistance test was carried out for 500 hours with the thus manufactured magnetooptical recording medium placed into a thermo-hydrostat of temperature 70° C. and relative humidity 85%, whereby the change of coercive force (Hc/Hc$_0$) was measured. The result shows that the use of any of PMMA and PC leads to $Hc/Hc_0$ of 0.9 which means excellence in corrosion resistance (Table 2).

For comparison, a test was also carried out at the same time with respect to a magneto-optical recording medium (Comparative Example 2) manufactured in the same manner as the above-described examples with the exception that instead of the $SiC-Si_3N_4$ film, SiO films were formed to thicknesses of 200 Å and 1000 Å, respectively, on the opposite sides of the recording layer by evaporation. The result was that $Hc/Hc_0$ was 0.5 and the corrosion resistance effect of $SiC-Si_3N_4$ was sufficiently great as compared with that of SiO.

EXAMPLE 5

A magneto-optical recording medium was manufactured in the same manner as Example 3 with the exception that instead of the $SiC-Si_3N_4$ film 3' on the recording layer 2, an SiO film was formed to a thickness of 1000 Å by evaporation, and a corrosion resistance test was carried out in the same manner as Example 3. $Hc/Hc_0$ of the present example was 0.7 (Table 2).

The improvement of the corrosion resistance of the $SiC-Si_3N_4$ film is apparent as compared with Comparative Example 2.

TABLE 2

| | Materials forming the layers | | | |
|---|---|---|---|---|
| | Substrate 1 | Film 3 | Recording layer 2 | Film 3' | $Hc/Hc_0$ |
| Example 3 | PMMA | $SiC-Si_3N_4$ | GdTbFe | $SiC-Si_3N_4$ | 0.9 |
| Example 4 | PC | $SiC-Si_3N_4$ | GdTbFe | $SiC-Si_3N_4$ | 0.9 |
| Example 5 | PMMA | $SiC-Si_3N_4$ | GdTbFe | SiO | 0.7 |
| Comparative Example 2 | PMMA | SiO | GdTbFe | SiO | 0.5 |

EXAMPLES 6-8

A glass plate of 200 mmφ formed with a pregroove by ultraviolet ray setting resin having a thickness of 10-100 μm was used as the substrate, and on this substrate, a recording layer of GdTbFe was fomred to a thickness of 200 Å in the same manner as Example 1. On the recording layer, layers A, B and C were formed to thickness of 500 Å, 500 Å and 1000 Å, respectively, as shown in Table 3 below.

An $SiC-Si_3N_4$ film was formed in a mixture of Ar and $N_2$ gases at a ratio of 1:1, in the same manner as Example 1. $SiC:Si_3N_4$ of the formed $SiC-Si_3N_4$ film is 50:50 atom %. An SiO film was formed by evaporation. The Al film of the layer B is a reflecting layer and was formed by evaporation.

A corrosion resistance test was carried out for 500 hours with the thus manufactured magneto-optical recording mediums placed into a thermo-hygrostat of temperature 85° C. and relative humidity 85%, whereby $Hc/Hc_0$ was measured. The result is shown in Table 3 below.

For comparison, a magneto-optical recording medium (Comparative Example 3) similar to Examples 6-8 with the exception that both of layers A and C were formed of SiO was manufactured and this recording medium was tested at the same time. The result is shown in Table 3 below.

TABLE 3

| | Layers | | | |
|---|---|---|---|---|
| | A (500 Å) | B (500 Å) | C (1000 Å) | $Hc/Hc_0$ |
| Example 6 | $SiC-Si_3N_4$ | Al | $SiC-Si_3N_4$ | 0.9 |
| Example 7 | $SiC-Si_3N_4$ | Al | SiO | 0.9 |
| Example 8 | SiO | Al | $SiC-Si_3N_4$ | 0.9 |
| Comparative Example 3 | SiO | Al | SiO | 0.6 |

As will be seen from the foregoing, the corrosion resistance can be improved by providing at least one layer consisting of a carbide and a nitride.

EXAMPLES 9-13

Use was made of substrates shown in Table 4 and each having a diameter of 200 mm and a thickness of 1.2 mm, and on each of the substrates, an $SiC-Si_3N_4$ film was formed to a thickness of 200 Å in a mixture of Ar and $N_2$ gases at a ratio of 1:1 in the same manner as Example 1. $SiC:Si_3N_4$ of the formed $SiC-Si_3N_4$ film is 50:50 atom %. GdTbFe as the recording layer was then formed to a thickness of 200 Å. On the recording layer, layers D, E and F were successively formed to thicknesses of 500 Å, 500 Å and 1000 Å, respectively, by the use of materials shown in Table 4 below, whereby magneto-optical recording mediums were manufactured. $SiC:Si_3N_4$ of the $SiC-Si_3N_4$ film formed as the layers D and F is 50:50 atom %, and this film was formed in the same manner as described above. An SiO film was formed by evaporation. An Al film formed as the layer E is a reflecting layer and was formed by evaporation.

A corrosion resitance test was carried out for 500 hours with the manufactured magneto-optical recording mediums placed into a thermo-hygrostat of temperature 70° C. and relative humidity 85%. $Hc/HcO_0$ is shown in Table 4 below.

For comparison, a magneto-optical recording medium (Comparative Example 4) similar to Example 9 with the exception that the $SiC-Si_3N_4$ film of Example 9 was formed by an SiO film was manufactured and was tested at the same time.

TABLE 4

| | Materials forming the layers | | | | | |
|---|---|---|---|---|---|---|
| | Substrate | Recording layer | D | E | F | $Hc/Hc_0$ |
| Example 9 | Glass | $SiC-Si_3N_4$ | GdTbFe | $SiC-Si_3N_4$ | Al | $SiC-Si_3N_4$ | 0.9 |
| Example 10 | PMMA | $SiC-Si_3N_4$ | GdTbFe | $SiC-Si_3N_4$ | Al | $SiC-Si_3N_4$ | 0.8 |
| Example 11 | PC | $SiC-Si_3N_4$ | GdTbFe | $SiC-Si_3N_4$ | Al | — | 0.8 |
| Example 12 | PMMA | $SiC-Si_3N_4$ | GdTbFe | $SiC-Si_3N_4$ | Al | SiO | 0.7 |
| Example 13 | PMMA | $SiC-Si_3N_4$ | GdTbFe | SiO | Al | $SiC-Si_3N_4$ | 0.7 |
| Comparative Example 4 | PMMA | SiO | GdTbFe | SiO | Al | SiO | 0.2 |

From the result shown in Table 4, it is seen that when use is made of a plastic substrate inferior in moisture resistance to glass, the improvement of moisture resistance by forming a film consisting of a carbide and a nitride in contact with the substrate is remarkable.

EXAMPLES 14-18

A recording layer was formed in the same manner as Example 1, whereafter two targets, i.e., SiC of 5 inches $\phi$ and AlN of 5 inches $\phi$, were sputtered at a time to thereby change the sputtering power to each target, whereby SiC-AlN films of various compositions shown in Table 5 below were layered to a thickness of 1000 Å. A corrosion resistance test was carried out with the thus manufactured magneto-optical recording mediums placed into a thermo-hygrostat of temperature 85° C. and relative humidity 85%, and $Hc/Hc_0$ after 500 hours and the transmittance of the SiC-AlN film at a wavelength 830 nm are shown in Table 5 below.

EXAMPLES 19-29

Like Examples 14-18 and Examples 3-13, magnetooptical recording mediums were made by the use of the various substrates, film thickness and medium constructions shown in Table 6 below, and a corrosion resistance test was carried out for 500 hours with the recording medium placed into a thermo hygrostat of temperature 70° C. and relative humidity 85% or temperature 85° C. and relative humidity 85%. $Hc/Hc_0$ obtained in this test is shown in Table 6 below. The composition of the SiC-AlN film used in these examples was SiC 40-50 atom % (AlN 60-50 Atom %).

TABLE 6

| | Substrate | Under-laid layer | Recording layer | Interference layer | Reflecting layer | Protective layer | $Hc/Hc_0$ |
|---|---|---|---|---|---|---|---|
| Example 19 | Glass | None | GdTbFe 200Å | SiC—AlN 500Å | Al 500Å | SiC—AlN 1000Å | *0.9 |
| 20 | " | " | " | SiC—AlN 500Å | " | SiO 1000Å | *0.9 |
| 21 | " | " | " | SiO 500Å | " | SiC—AlN 1000Å | *0.9 |
| 22 | " | SiC—AlN 200Å | " | SiC—AlN 500Å | " | None | 0.9 |
| 23 | PMMA | " | " | SiC—AlN 500Å | " | SiC—AlN 1000Å | 0.8 |
| 24 | PC | " | " | SiC—AlN 500Å | " | SiC—AlN 1000Å | 0.8 |
| 25 | PMMA | " | " | SiC—AlN 500Å | " | SiO 1000Å | 0.7 |
| 26 | " | " | " | SiO 500Å | " | SiC—AlN 1000Å | 0.7 |
| 27 | " | " | GdTbFe 1000Å | None | None | SiC—AlN 1000Å | 0.9 |
| 28 | PC | " | " | " | " | SiC—AlN 1000Å | 0.9 |
| 29 | PMMA | " | " | " | " | SiO 1000Å | 0.7 |

(Mark * indicates the result of the corrosion resistance test at 85° C. and 85%, and the others indicate the result of the same test at 70° C. and 85%)

TABLE 5

| | SiC | AlN | Transmittance | $Hc/Hc_0$ |
|---|---|---|---|---|
| Comparative Example 5 | 0 atom % | 100 atom % | 92 | 0.7 |
| Example 14 | 5 | 95 | 92 | 0.8 |
| Example 15 | 15 | 85 | 92 | 0.9 |
| Example 16 | 45 | 55 | 91 | 0.9 |
| Example 17 | 80 | 20 | 90 | 0.9 |
| Example 18 | 90 | 10 | 83 | 0.9 |
| Comparative Example 6 | 100 | 0 | 74 | 0.9 |

As a result, Comparative Examples 5 and 6 which use only SiC and AlN, respectively, cannot make the most of the merits of these two materials and are inferior in transmittance and corrosion resistance, respectively. In the range of SiC 5-90 atom % (in this case, AlN 95-10 atom %), and preferably SiC 15-80 atom % (in this case, AlN85-20 atom %), the magneto-optical recording medium is excellent both in corrosion resistance and optical characteristic.

As a result, it is seen that as compared with Comparative Examples 2, 3 and 4 which use only an SiO film, the SiC-AlN film has the effect of preventing the entry of water, oxygen, etc. from the plastic substrate or the air and suppressing the deterioration of the magnetic film as does the $SiC-Si_3N_4$ film.

Only the example of GdTbFe has been shown as the magnetic recording layer, but the use of GdTbFeCo has resulted in an improvement of the corrosion resistance equal to or greater than that in the shown examples. As previously mentioned, the optical recording layer in the present invention is not limited to the magnetic recording layer.

The corrosion resistance can be improved by forming on the substrate a film consisting of at least one layer of carbide and nitride. The effect is particularly remarkable if such film is provided in contact with the plastic substrate whose inferiority in corrosion resistance has been a serious problem.

What we claim is:

1. An optical recording medium comprising:
    a substrate;
    an optical recording layer formed on said substrate for recording and reproducing information by irradiation with a light beam; and
    a corrosion resistant film formed on at least one side of said optical recording layer, said film consisting of a mixture of silicon carbide and one of silicon nitride and aluminum nitride.

2. An optical recording medium according to claim 1, wherein said film is formed on at least one side of said optical recording layer and in contact with said recording layer.

3. An optical recording medium according to claim 1, wherein said film is formed on at least one side of said optical recording layer with another layer interposed therebetween.

4. An optical recording medium according to claim 1, wherein said film is a film of a mixture of silicon carbide and silicon nitride containing 10-90 atom % of silicon carbide relative to the total amount of said film.

5. An optical recording medium according to claim 1, wherein said film is a film of a mixture of silicon carbide and aluminum nitride containing 5-90 atom % of silicon carbide relative to the total amount of said film.

6. An optical recording medium according to claim 1, wherein the thickness of said film is 50-10000 Å.

7. An optical recording medium according to claim 1, further comprising a reflecting layer.

8. An optical recording medium according to claim 1, further comprising an interference layer.

9. An optical recording medium according to claim 1, wherein said substrate consists of plastic, and said at least one film includes a film formed in contact with said substrate.

10. An optical recording medium according to claim 1, wherein said recording layer consists of GdTbFe.

11. An optical recording medium according to claim 1, wherein said recording layer consists of GdTbFeCo.

* * * * *